THOMAS TAYLOR, OF WASHINGTON, DISTRICT OF COLUMBIA.

Letters Patent No. 82,891, dated October 6, 1868.

---

IMPROVED MODE OF PREPARING PLASTER CASTS.

---

*The Schedule referred to in these Letters Patent and making part of the same.*

---

TO ALL WHOM IT MAY CONCERN:

Be it known that I, THOMAS TAYLOR, of Washington, District of Columbia, have invented an Improved Mode or Process of Perfecting the present Mode of taking Impressions in Vulcanized Rubber from a Matrix of Plaster of Paris or other material; and I do hereby declare that the following is a full and exact description.

In making "rubber gums," in dentistry, a matrix is first formed in plaster of Paris by the dentist, and firmly secured in position into an iron or metal case, over which is placed a sheet of rubber, prepared with sulphur or its compounds. A second plaster cast, secured also in an iron or metal frame, is placed over the matrix, the one plaster fitting into the other, but kept apart by the sheet of prepared rubber between.

By means of clamps, the sheet rubber is compressed within the top and bottom plaster form, taking a good impression of the plaster forms, whether plain or ornamental. It is then, while compressed, subjected to a proper degree of heat. When it becomes vulcanized, it is allowed to cool in the same position.

When cold, the rubber is removed from the plaster forms. At this stage of the process, it is found to be covered with a thin crust of plaster of Paris, and which has become baked, and firmly secured to the rubber.

The removal of this crust causes a great waste of time. Sometimes the dentist will varnish the plaster of Paris casts, with a view of preventing the same from sticking to the rubber, but in the use of a varnish a new evil comes into play: the varnish, by reason of the high temperature to which it is subjected, becomes charred, and adheres to the rubber forms produced.

To enable others skilled in the use and in the art to make and to use my invention or process, I shall proceed now to describe the same; and I do hereby declare that the following is a full and exact description of my process.

I take any object of proper form, and made of plaster of Paris, which may be a cast of human gums, and dry it by heat or any other proper mode, taking care that the object is not heated so highly as to expel any of its component parts. I then coat its surface with a mixture of, say, one-third water to two-thirds glycerine, or with one-third glycerine to two-thirds water. When too much glycerine is employed it is apt to remain on the surface in a sticky form, which is objectionable. Much depends on the character of the plaster of Paris, and how it is mixed. If the plaster has been mixed thin, that is, with a large portion of water, the cast will be porous and will absorb more of the glycerine mixture. In short, the strength of the mixture will have to be varied according to the character of the plaster of Paris and density of the object. The use of the glycerine will be explained hereafter.

Second process: I make a mixture of, say, one-third glycerine to two-thirds silicate of potash, or thereabout, which mixture I shall style, hereafter, silicate varnish, the properties of which I shall hereafter describe. When the plaster cast is dry and not sticky, it is ready to be varnished with the silicate varnish; but should the surface prove sticky, the glycerine, the cause of the stickiness, should be removed by a moist sponge, and, when dry, varnish once or oftener with the glycerine and silicate compound. When the process is properly finished, the surface subjected to the process will have a smooth and shining surface.

I sometimes use a pure silicate as a varnish, but the use of a pure silicate of, say, soda or potash, gives too little time to the operator, for the acid in the plaster quickly attacks alkali, forming a sulphate of the alkali on the surface of the object, and rendering it worthless. The salt of soda, sulphate of soda, or salt of potash, sulphate of potash, as may have been employed, will form an efflorescence on the varnished surface, destroying wholly the character of the varnish; but by combining the silicate of soda, or other silicate, with glycerine, the efflorescence is prevented. The glycerine neutralizes the sulphuric acid, and thus allows the silicate varnish to remain smoothly on the object. Should the varnish not dry firmly, but sticky, remove it with a moist sponge, and add to the varnish more silicate of soda or silicate of potash, as may have been employed, and revarnish the object. When it is dry and has a good gloss, the object is ready to be employed for the rubber impressions. The dentist now takes a rubber impression by any of the well-known modes. When the vulcanized-rubber gum is made and removed from the plaster of Paris moulds, it will be seen that the rubber gum has a rough surface, and whitish, and which is a silicate of lime, and which is very securely attached to the rubber, and is not easily removed by the use of a hard brush. To remove this hard and rough surface, I employ chemical means. I have stated that the substance on the surface of the rubber is a silicate of lime. It is formed in this manner:

When the heat is being employed to vulcanize the rubber gum, the sulphuric of the plaster of Paris is liberated and attacks the soda, or whatever alkali has been used to form the silicate varnish, decomposing the varnish and forming a sulphate of the alkali employed, while the silica combines with the lime liberated from the sulphuric acid, forming a glass silicate of lime on the surface of the rubber, to remove which I employ a solvent of silica, such as caustic alkalies. I find that even hot carbonates of soda or potash dissolve the silica, it is so very thin. The object (rubber gum) should be placed in the hot alkaline solution until the silica is wholly dissolved; other means may be employed, such as the use of an acid which will dissolve silica. Hydrofluoric acid, for example, will dissolve the silica in a cold state. When the silicate of lime is removed from the rubber, the object of the experiment is complete; but should the surface of the rubber have an alkaline taste, it may be washed in cream of tarter or other weak acid; but if cleaned with hydrofluoric acid, a weak alkali should be used as a wash.

I find that plaster of Paris which has been subjected to more heat than the common plaster of Paris, has, on some occasions, its free sulphuric acid expelled by such heat. Objects made of such plaster may be safely varnished with silicate of soda only, or other silicate, and without the use of glycerine or its equivalent.

Having described the nature of my process and invention, I shall now set forth my claims.

1. I claim the use of silicate of soda or other soluble silicate, with or without glycerine, as a varnish, for the purposes as substantially set forth and described herein.

2. I claim the use of alkalies or their equivalents, when used as solvents of silicates, when used substantially as in the manner herein set forth and described.

THOMAS TAYLOR.

Witnesses:
 CHARLES BROME
 WM. N. OPDYKE.